(12) United States Patent
Battles et al.

(10) Patent No.: US 10,246,257 B1
(45) Date of Patent: Apr. 2, 2019

(54) ROTATING STORAGE SYSTEMS

(71) Applicant: Amazon Technologies, Inc., Seattle, WA (US)

(72) Inventors: Jon Stuart Battles, North Bend, WA (US); Martin Peter Aalund, Seattle, WA (US); John Elias Darrow, Shoreline, WA (US); Timothy Alan Talda, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 136 days.

(21) Appl. No.: 15/408,772

(22) Filed: Jan. 18, 2017

(51) Int. Cl.
*G06F 7/00* (2006.01)
*B65G 1/137* (2006.01)
*B65G 33/04* (2006.01)
*B65G 47/90* (2006.01)

(52) U.S. Cl.
CPC ............. *B65G 1/137* (2013.01); *B65G 33/04* (2013.01); *B65G 47/90* (2013.01)

(58) Field of Classification Search
None
See application file for complete search history.

(56) References Cited

U.S. PATENT DOCUMENTS 4,382,422 A * 5/1983 Eddy .................... B05B 13/0242
118/302

\* cited by examiner

*Primary Examiner* — Yolanda R Cumbess
(74) *Attorney, Agent, or Firm* — Kilpatrick Townsend & Stockton LLP

(57) ABSTRACT

Systems, methods, and devices are described herein for managing item storage using rotating platforms. In some examples, an item can be loaded on to a material conveyance device. The item then can be unloaded from the material conveyance device to a rotating platform. The rotating platform can include a sloped surface. Sensor data that identifies the item can be received. A robotic manipulator can be used to manipulate the item based at least in part on the sensor data.

19 Claims, 11 Drawing Sheets

ROTATING STORAGE SYSTEMS

BACKGROUND

Item storage facilities such as warehouses and distribution centers are designed to store inventory items. To this end, such facilities may include shelving units, such as vertical shelving units, where the inventory items are held until they are needed (e.g., to fulfill a customer order).

A combination of automated and human operators may be required to place and remove inventory items from the shelving units. For instance, a human operator may be instructed to remove an item from a conveyor belt and place it on a particular shelf where the item will be stored for some period of time. When an order for the item is received, the human operator can navigate to a location in the warehouse where the shelf is located, and there retrieve the item to fulfill the order.

BRIEF DESCRIPTION OF THE DRAWINGS

Various embodiments in accordance with the present disclosure will be described with reference to the drawings, in which.

DETAILED DESCRIPTION

Figure 1:
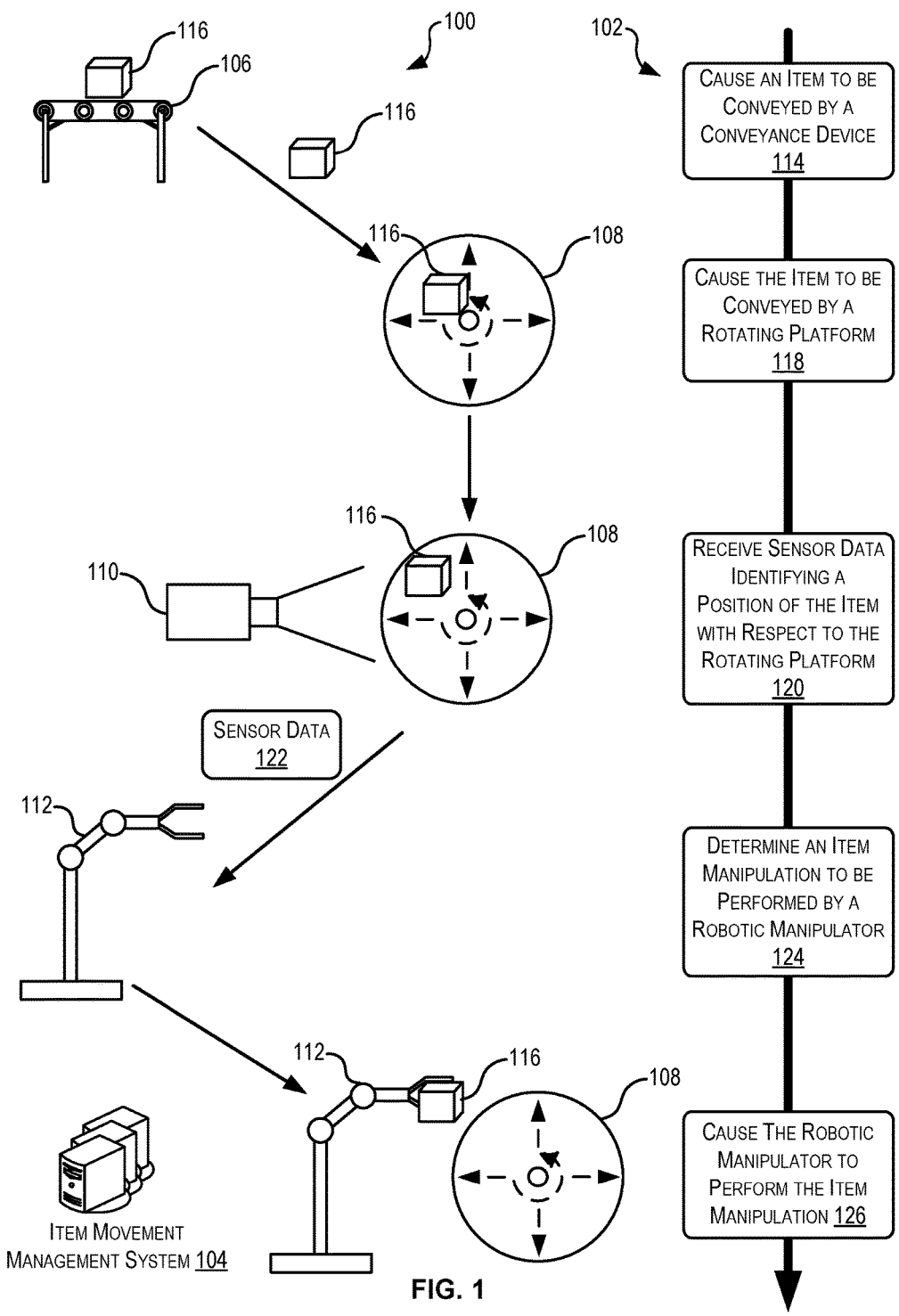
FIG. 1 illustrates an example block diagram and corresponding example flow diagram for managing item storage using rotating platforms, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Examples described herein are directed to devices, systems, and techniques for managing item storage using rotating platforms. In particular, the examples described herein may enable high-density storage systems including automated item storage and retrieval, with little to no human assistance. Such storage systems may be achieved by using an item movement management system (e.g., a set of computing devices) that coordinates the actions of automated material handling equipment, including rotating platforms, using item-level data. The rotating platforms described herein may enable improved item storage and retrieval as compared to conventional storage techniques. For example, the rotating platforms may enable improved storage density, decreased time needed for storage and retrieval of items, and fewer lost items. These improvements, along with others, may result in increased system throughput and decreased overall operating costs.

Turning now to a particular example, in this example, multiple units of rotating storage platforms are provided in a storage facility. Their operation and the operation of other material handling equipment are managed by a computer system. Each unit includes a set of rotating storage platforms stacked on top of each other. The units are connected to each other via conveyor belts or other material handling equipment, which may be conventional. Each rotating storage platform can be driven by its own independent drive motor to enable variable speeds, or the entire set can be driven by a single drive motor. Each rotating storage platform is circular in shape, includes an opening and a rotational axis disposed through its center, and has an upper surface that may slope downward from the center towards a circumferential perimeter. In this manner, each rotating storage platform may correspond to a conical frustum that rotates about a vertical axis extending through the frustum. For each unit, a rotating elevator, such as a helical lifting platform, can be disposed centrally within the openings of the set of rotating storage platforms. The computer system manages the operation of the rotating elevator to deliver items to the appropriate level of the unit (e.g., the particular rotating storage platform). The computer system can select the appropriate rotating storage platform based on characteristics of the item, characteristics of the platforms, and other similar information. Once an item is removed from the elevator and placed on a rotating platform, centrifugal and gravitational forces acting on the item will cause the item to consolidate towards the perimeter edge of the platform. These forces function to consolidate items on the rotating storage platform near the perimeter edge. This creates a naturally dense arrangement for storing items. An item tracking system including an optical sensor, radio-frequency identification (RFID) reader, and/or other sensors is provided in connection with each rotating storage platform. The item tracking systems scan the upper surfaces of the rotating storage platforms where the items are held. Using this scan data, the computer system tracks real-time positions of the items with respect to the rotating storage platforms. When retrieval of an item is requested (e.g., to fulfill a customer order), the computer system shares position data corresponding to the item with a robotic manipulator. The computer system or the robotic manipulator may then compute a strategy for removing the item from the rotating storage platform.

Turning now to the figures, FIG. 1 illustrates a simplified block diagram 100 depicting an example process 102 for managing item storage using rotating platforms, according to at least one example. In particular, the process 102 describes a process for loading an item on to a rotating platform and unloading the item from the rotating platform. The diagram 100 depicts example states that correspond to the blocks in the process flow 102. The diagram 100 includes an item movement management system 104 that performs at least a portion of the process 102. The item movement management system 104, as described herein, can include any suitable combination of local and/or networked computing devices configured to communicate with at least a material conveyance device 106, a rotating platform 108, a sensor 110, and/or a robotic manipulator 112. Such communication can take place over one or more networks as described with reference to FIG. 2. In some examples, the item movement management system 104 is also configured to generate instructions for execution by the robotic manipulator 112.

The process 102 begins at 114 by causing an item (e.g., an item 116) to be conveyed by a conveyance device (e.g., the material conveyance device 106). The item 116 can be any suitable item stored in a material storage facility including, for example, personal electronic devices, computers, recreational equipment, food products, television sets, clothing, household supplies, automotive parts, appliances, books, and any other suitable object capable of being stored. The material conveyance device 106 can be any suitable material conveyance system including, for example, a pneumatic conveyor system, a vibrating conveyor system, a flexible conveyor system, a vertical conveyor system, a spiral conveyor system, an overhead conveyor system, and/or any other suitable material conveyance system suitable for conveying items. In some examples, the conveyance at 114 includes more than one conveyance using more than one material conveyance device 106. For example, a first material conveyance device 106 can include a horizontal conveyor belt to convey the item 116 from an unloading dock to a storage unit including the rotating platform 108. A second material conveyance device 106 can be a vertical conveyor system and can convey the item 116 to the particular rotating platform 108 of the storage unit. In between blocks 114 and 118, the item 116 can be removed from the material conveyance device 106. For example, an automated moveable diversion structure (e.g., a sliding gate, a rotating arm, etc.) can be instructed by the item movement management system 104 to cause the item 116 to be removed at the particular rotating platform 108. As described herein, the particular rotating platform 108 may be selected from among a plurality of concentrically-aligned rotating platforms 108.

At 118, the process 102 causes the item 116 to be conveyed by a rotating platform (e.g., the rotating platform 108). As described herein, the rotating platform 108 can have a disk shape, annular shape, or other comparable ring shape, and can include an upper surface that is flat, sloped, or have any other suitable profile as described herein. Thus, in some examples, the rotating platform 108 can be considered a sloped rotating disk. For example, arrows on the rotating platform 108 indicate that the upper surface slopes downwards from a center point towards a perimeter edge. As the item 116 is conveyed by the rotating platform 108 (e.g., rotated), the item 116 slides towards the perimeter edge because of this movement and because of this slope. As the rotating platform 108 may also support other items, the item 116 consolidates with the other items.

At 120, the process 102 receives sensor data (e.g., sensor data 122) identifying a position of the item 116 with respect to rotating platform 108. For example, the sensor data 122 can be received from the sensor 110. The sensor 110 can be located proximate to the rotating platform 108 and in a manner that the sensor 110 can sense items 116 supported on the upper surface of the rotating platform 108. The sensor 110 can include one or more suitable sensors for item tracking (e.g., optical sensor, RFID reader and antenna, quantum dot sensor, position sensor, Light Detection and Ranging (LIDAR), Radio Detection and Ranging (RADAR), haptic, laser scanner, etc.) in any of their various forms. The sensor data 122 therefore corresponds to the type(s) of sensors selected for the sensor 110. In some examples, the sensor data 122 includes sensor data from two or more sensors 110. For example, first sensor data 122 can be RFID sensor data that indicates the presence of an RFID tag previously associated with the item 116 and second sensor data can be image sensor data that identifies the item 116 and an area surrounding the item 116. The sensor data 122 can be used for detecting the presence of the item 116, the condition of the item 116, the position of the item 116 on the rotating platform 108, and/or for any other suitable purpose. For example, the area surrounding the item 116 identified by the sensor data 122 (e.g., an image) may include one or more visual indicia present on the upper surface of the rotating platform 108. The one or more visual indicia may be used to determine the position of the item 116 with respect to the rotating platform 108.

In some examples, the sensor data 122 includes one or more images of the item 116, which may be processed in any suitable image processing technique to extract information from the images. The images may depict the item 116, other items 116, and an area surrounding the item 116 and the other items 116. These images can be processed to identify the items present in the images. This may be achieved, for example, by matching images of items stored in an image database with the images of items on the rotating platform 108. Once an item has been identified, information about that item can be accessed for use in accordance with techniques described herein.

The sensor data 122 can also be used for other purposes. For example, at 124, the process 102 determines an item manipulation to be performed by a robotic manipulator (e.g., the robotic manipulator 112). This determination can be based at least in part on the sensor data 122. In some examples, the item movement management system 104 determines the item manipulation. In other examples, the robotic manipulator 112 determines the item manipulation. In some examples, the item manipulation determined at 124 depends on the capacities and characteristics of the robotic manipulator 112, types of end effectors available by the robotic manipulator 112, characteristics of the item (e.g., surface properties, weight, fragility, etc.), rotational speed of the rotating platform 108, items surrounding the item 116, and any other suitable information. In some examples, the item manipulation includes removal of the item 116 from the rotating platform 108 and placement of the item 116 on a second material conveyance device (e.g., a conveyor device heading towards a loading dock), removal of the item 116 from a first position on the rotating platform 108 and placement of the item 116 at a second position on the rotating platform 108 (e.g., platform rearrangement), removal of the item 116 from the rotating platform 108 and placement of the item 116 at a second rotating platform (e.g., unit rearrangement), minor adjustment of the position of the item 116 on the rotating platform 108 (e.g., item rearrangement), and any other suitable item manipulation. In some examples, determining the item manipulation may include computing a grasping strategy (e.g., trajectory, speeds, etc.)

for the robotic manipulator 112 to pick up the item 116 from the rotating platform 108 based at least in part on the sensor data 122 and velocity data describing a velocity of the rotating platform 108.

At 126, the process 102 causes the robotic manipulator 112 to perform the item manipulation. This can include the robotic manipulator 112 executing the item manipulation. In some examples, this includes the item movement management system 104 instructing the robotic manipulator 112 to perform the item manipulation.

Figure 2:
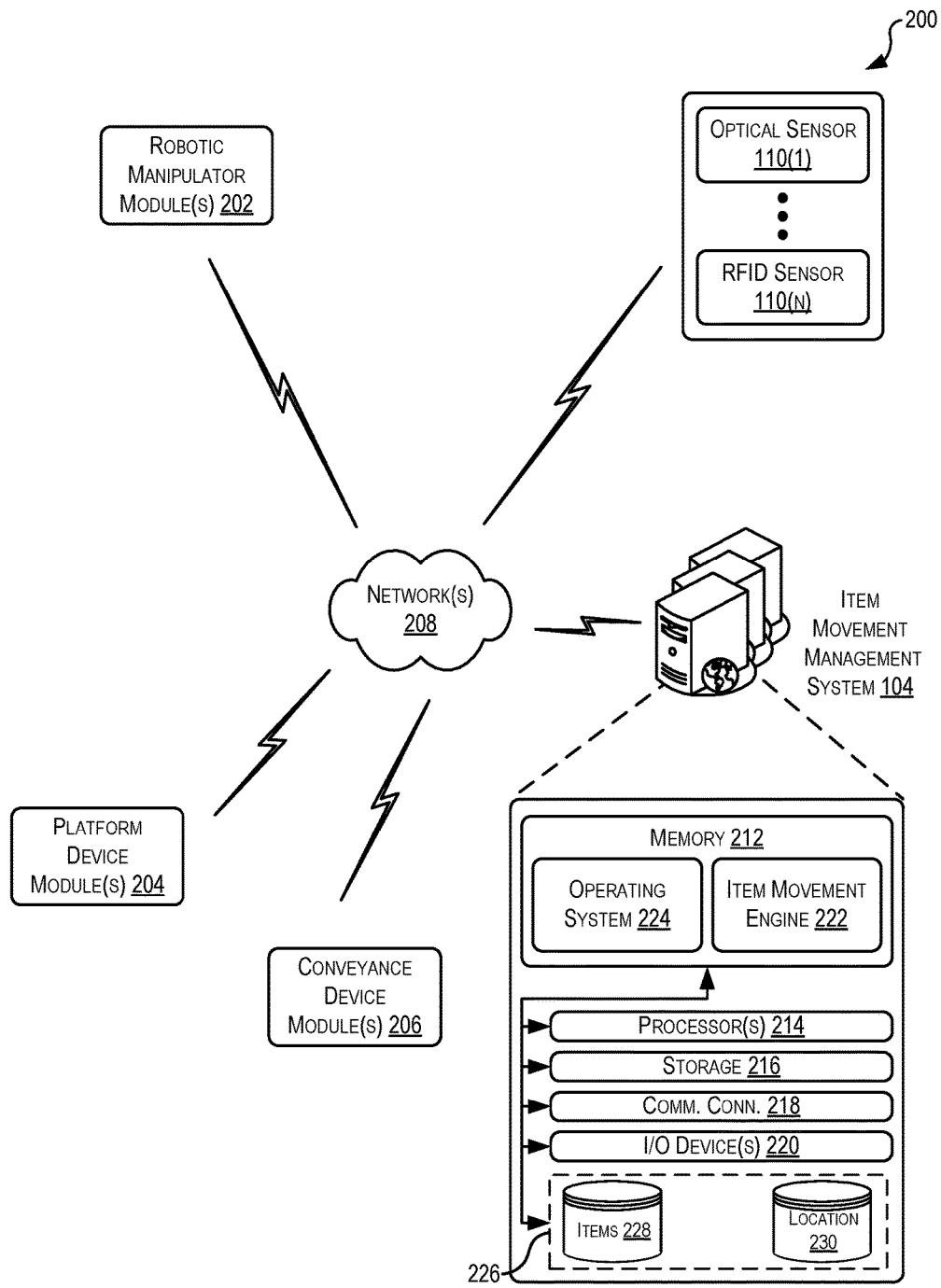
FIG. 2 illustrates an example schematic architecture or system relating to managing item storage using rotating platforms, according to at least one example.

FIG. 2 illustrates an example schematic architecture or system 200 relating to managing item storage using rotating platforms, according to at least one example. The architecture 200 includes the item movement management system 104, sensor(s) 110, robotic manipulator module(s) 202, platform device module(s) 204, and conveyance device module(s) 206 in communication with each other via one or more networks 208. The network 208 may include any one or a combination of many different types of networks, such as cable networks, the Internet, wireless networks, cellular networks, satellite networks, other private and/or public networks, or any combination thereof. In some examples, certain ones of the elements of the architecture 200 communicate via a first network, while other elements communicate via a second network. The networks 208 may also include wireless personal area networks such as Bluetooth, Wi-Fi, and other similar wireless networks. In some examples, the elements of the architecture 200 are electrically coupled to each other instead of, or in addition to, the network 208. For example, the sensors 110 may share a hardwired connection with the item movement management system 104.

The sensors 110 may include any suitable sensor 110(1)-110(n) usable to detect position of items, presence of items, characteristics of items, and the like. For example, the sensors 110 may include optical sensors 110(1) and an RFID sensor 110(n). In some examples, the sensors 110 may be usable to gather data in one dimension, in two dimensions, or in three dimensions.

The robotic manipulator modules 202, the platform device modules 204, and the conveyance device modules 206 may include any suitable combination of software and/or hardware to control their respective devices. For example, the robotic manipulator module 202 may include any suitable control circuitry capable of receiving, processing, executing, and generating instructions relating to movement of the degrees of freedom of the robotic manipulator 112. The platform device module 204 may include any suitable motor control circuitry (e.g., speed sensor, variable speed drive, power switch, etc.) in communication with drive motors of the rotating platforms 108. The conveyance device modules 206 may include any suitable motor control circuitry (e.g., speed sensor, variable speed drive, power switch, etc.) in communication with drive motors of the material conveyance devices 106. The conveyance device modules 206 may also include circuitry to control the operation of moveable diversion structures.

The item movement management system 104 may be configured to manage aspects of managing item storage using rotating platforms. To this end, the item movement management system 104 may include any suitable combination of one or more computing devices such as, but not limited to, a server, a virtual machine instance, a set of servers or set of virtual machines, a mobile phone, a smartphone, a PDA, a laptop computer, a desktop computer, a thin-client device, a tablet computer, etc. The item movement management system 104 may function to manage the operation of the other elements in the architecture 200. For example, the item movement management system 104 may synchronize movements of material conveyance devices (e.g., the material conveyance device 106) by generating instructions and communicating those instructions to the conveyance device modules 206 that are local to the material conveyance devices. The conveyance device modules 206 may also provide feedback to the item movement management system 104 that can be used by the item movement management system 104 to improve future instructions, update databases, and the like. The item movement management system 104 may also generate instructions for the platform device modules 204 to control operations of rotating platforms (e.g., the rotating platforms 108). These instructions can be provided to the platform device modules 204 in any suitable manner. The item movement management system 104 may also generate instructions for the robotic manipulator modules 202 to control operations of robotic manipulators (e.g., the robotic manipulator 112). These instructions can be provided to the robotic manipulator modules 202 in any suitable manner.

Turning now to the item movement management system 104 in detail, in some examples, the item movement management system 104 may include at least one memory 212 and one or more processing units (or processor(s)) 214. The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described.

The memory 212 may store program instructions that are loadable and executable on the processor(s) 214, as well as data generated during the execution of these programs. Depending on the configuration and type of the item movement management system 104, the memory 212 may be volatile (such as RAM) and/or non-volatile (such as ROM, flash memory, etc.). The item movement management system 104 may also include additional removable storage and/or non-removable storage 216 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 212 may include multiple different types of memory, such as SRAM, DRAM, or ROM. While the volatile memory described herein may be referred to as RAM, any volatile memory that would not maintain data stored therein once unplugged from a host and/or power would be appropriate. The memory 212 and the additional storage 216, both removable and non-removable, are both additional examples of non-transitory computer-readable storage media.

The item movement management system 104 may also contain communications connection(s) 218 that allow the item movement management system 104 to communicate with a data store, another computing device or server, user terminals and/or other devices via the networks 208. In this manner, the communications connections 218 can include network interfaces to enable connection to network devices. The item movement management system 104 may also include I/O device(s) 220, such as a keyboard, a mouse, a pen, a voice input device, a touch input device, a display, speakers, a printer, etc.

Turning to the contents of the memory 212 in more detail, the memory 212 may include an operating system 224 and/or one or more application programs or services for implementing the features disclosed herein including an item movement engine 222. In some examples, the item movement engine 222 may be configured to manage item storage using rotating platforms.

The item movement management system 104 may also include a data store 226. In some examples, the data store 226 may include one or more data stores, databases, data structures, or the like for storing and/or retaining information associated with the item movement management system 104. For example, the data store 226 may include databases, such as an item database 228 and a location database 230.

The item database 228 may be used to store information about the items 116 as described herein. For example, the item database 228 may include characteristics or properties of the items 116. The item database 228 may be organized according to unique item identifiers such as serial numbers assigned by a materials handling facility, serial numbers assigned by a manufacturer, RFID tag numbers, and any other unique identifier. The characteristics or properties included in the item database may include, for example, weight, dimensions, volume, item type, special considerations (e.g., fragile, toxic, flammable, etc.), whether reserved for an order, expected time for storage, stock item images, other item images (e.g., captured at different points in time while the item is being stored), and any other suitable information.

The location database 230 may be used to store location information about the items 116 as they move throughout a material handling facility. For example, using sensor data sensed by the sensors 110, the item movement management system 104 may track the location of the items 116 in real time. Updated locations of the items 116 may be stored to the location database 230. The location information, in some examples, may indicate not only a standard location (e.g., on "Platform B6"), but may also indicate a specific position with respect to the standard location (e.g., position radially and circumferentially with respect to the "Platform B6").

Figure 3:
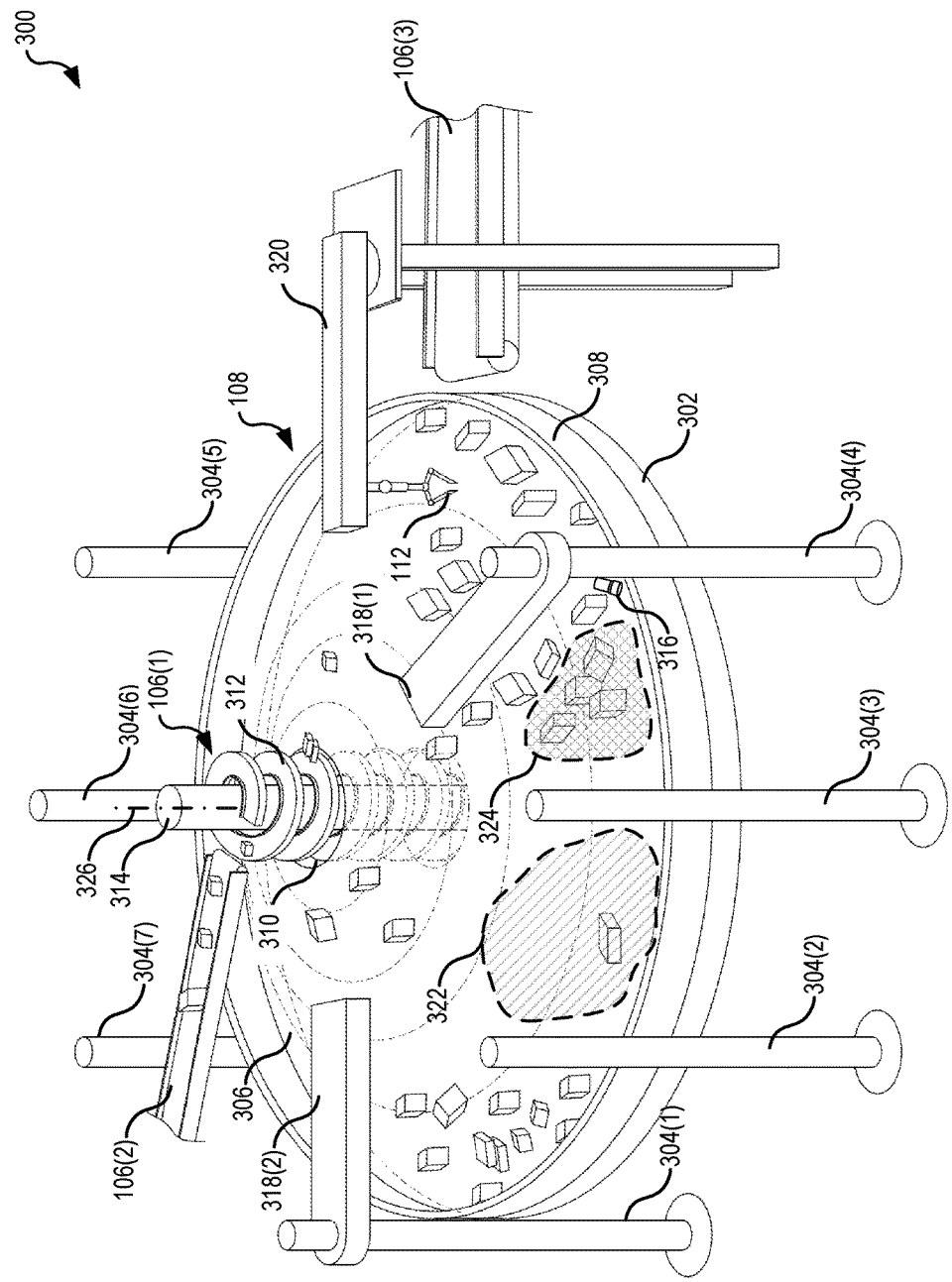
FIG. 3 illustrates a diagram of an example rotating storage system, according to at least one example.

FIG. 3 illustrates a diagram of an example rotating storage system 300, according to at least one example. The rotating storage system 300 may include the rotating platform 108 supported by a support frame 302. The rotating platform 108 may be configured to support the items 116. The rotating platform 108 may be in communication via one or more gears, gear boxes, drive shafts, belts, chains, drive wheels, or the like with a platform drive motor or other comparable movement device. The platform drive motor may be configured to cause the rotating platform 108 to rotate about a rotational axis 326. In some examples, the platform drive motor (and gear boxes, if appropriate) may provide for variable speeds, but a single speed drive motor may also be used. The platform drive motor may be controlled by the platform device module 204. Rotation of the rotating platform 108 may cause continuous consolidation of the items 116 supported on the rotating platform 108. This continuous movement of the items 116 may prove to maximize item density on the rotating platform. In this manner, use of the rotating platforms 108 provides for dense storage of the items 116.

The rotating platform 108 may be defined as having an upper surface 306, a lower surface (not shown), and a perimeter wall 308. The upper surface 306, visible in FIG. 3, may be configured to support the items 116 as described herein.

The upper surface 306 may be constructed to have any suitable surface properties to achieve a desired coefficient of friction between the items 116 and the upper surface 306. For example, the upper surface 306 may include texturing, raised ridges, dimples, or other structural changes. The upper surface 306 may also be painted, coated, polished, or otherwise altered. The upper surface 306 may also include one or more active systems to impact movement of the items 116. For example, the upper surface 306 may include a vibratory element configured to vibrate the upper surface 306. Similarly, the upper surface 306 may include an array of holes through which a compressed gas (e.g., air) may be blown. Depending on the implementation, sets of holes in the array may be selectively used to blow compressed gas at different locations on the upper surface 306. This may enable targeted movement of certain items 116.

The upper surface 306 may also include any suitable indicia associated therewith. For example, the upper surface 306 may be divided into sectors, sub sectors, and/or other circular divisions, with lines between the divisions indicated. For example, the lines may be painted, imprinted, stamped, or the like. In some examples, the lines are established using RFID or other similar technologies. In some examples, the upper surface 306 may include position indicators disposed at or about a perimeter edge of the upper surface 306. These position indicators may include a sequential listing of numbers (e.g., 1-50), degree measurements based on 360 degrees (e.g., every 5 degrees), and any other suitable division. In some examples, the position indicators are visibly/optically identifiable or identifiable using electrical signals. A suitable sensor 316 may be provided to detect the position indicators.

The perimeter wall 308 may be suitably sized to keep the items 116 from sliding off of the rotating platform 108. In some examples, the perimeter wall 308 is attached to the upper surface 306 and therefore rotates together with the rotating platform 108. In some examples, the perimeter wall 308 is included as part of the support frame 302 and is therefore stationary.

As discussed in further detail herein, the support frame 302 may have a disk shape and may further be defined to have an upper surface and a lower surface. The upper surface of the support frame 302 may provide support to the lower surface of the rotating platform 108. For example, such support may be provided via a set of bearings and/or wheels disposed between the rotating platform 108 and the support frame 302. The support frame 302 can be formed from any suitably rigid material including steel, iron, aluminum, and the like.

The support frame 302 may be supported by a plurality of legs 304(1)-(n). The legs 304 can be attached to the support frame 302 via any suitable manner including, for example, welding, bolting, riveting, and the like. When more than one rotating platform 108 is provided, additional support frames 302 may also be provided. These additional support frames 302 may also be supported by the legs 304.

The rotating storage system 300 may also include an elevator material conveyance device 106(1), an inbound material conveyance device 106(2), and an outbound material conveyance device 106(3). The inbound material conveyance device 106(2) and the outbound material conveyance device 106(3) may be any suitable moving platform, conveyor belt, or the like. The elevator material conveyance device 106(1) may be any suitable material conveyance device capable of moving the items 116 vertically. For example, the elevator material conveyance device 106(1) may be configured to vertically move the items 116 (e.g., up and/or down) via a vibrating surface, a moving belt, and the like. In some examples, the elevator material conveyance device 106(1) is a spiral elevator that includes a helical element 312 extending around a support structure 314. The helical element 312, in some examples, includes a continuous belt that continues vertically down and connects with a lower portion of the helical element 312. The elevator material conveyance device 106(1), like the other material conveyance devices 106, may include a drive motor or other comparable movement device. The drive motor causes the elevator material conveyance device 106(1) to rotate.

The inbound material conveyance device 106(2) may be configured to deliver the items 116 at the center point of the rotating platform 108, or at any other suitable location. In this example, the rotating platform 108 may not include an opening 310 and the elevator material conveyance device 106(1). Instead, the inbound material conveyance device 106(2) may directly drop the items 116 onto the rotating platform 108. In some examples, the inbound material conveyance device 106(2) moves the items 116 towards the elevator material conveyance device 106(1) and transfers the items 116 to the elevator material conveyance device 106(1) at a loading location (e.g., a location where the items 116 are loaded on to a conveyance device or rotating platform). The elevator material conveyance device 106(1), which may be disposed in the opening 310, may then rotate to move the items 116 down to the upper surface 306 of the rotating platform 108.

In some examples, the inbound material conveyance device 106(2) delivers the items 116 to the elevator material conveyance device 106(1) at a location below the rotating platform 108. In this example, the elevator material conveyance device 106(1) may be configured to move the items 116 from below the rotating platform 108 to the upper surface 306 of the rotating platform 108.

The items 116 may be removed from the elevator material conveyance device 106(1) in any suitable manner. For example, the elevator material conveyance device 106(1) may include one or more moveable diversion structures to divert the appropriate items 116 on to the appropriate rotating platform 108. Examples of such moveable diversion structures may include sliding gates, rotating arms, telescoping rams, vibrating platforms, drop-out platforms, and any other suitable structure capable of diverting the items 116.

As further described herein, the outbound material conveyance device 106(3) may be configured to convey the items 116 away from the rotating platform 108. For example, the robotic manipulator 112 may be configured to pick up items 116 from the upper surface 306 and place them on the outbound material conveyance device 106(3) as part of fulfilling an order.

The rotating storage system 300 may also include one or more sensor structures 318(1)-318(n) and one or more robotic manipulator structures 320. Each sensor structure 318 may include one or more sensors such as the sensors 110. At least one sensor structure 318 may be disposed adjacent to the robotic manipulator structure 320 such that the sensors 110 can sense items prior to those items 116 being presented to the robotic manipulator 112 of the robotic manipulator structure 320. This may be desirable to allow time for computation of a manipulation strategy between a first time when the sensor data is gathered by the sensors 110 and a second later time when execution of the manipulation strategy by the robotic manipulator 112 is performed. The sensor structure 318 may extend over the upper surface 306 in order to position the sensors 110 over the upper surface 306. The sensors 110 may be configured to continuously sense the absence and presence of items 116 on the upper surface 306 and can also sense velocity of those items with respect to the sensors 110. Sensing data from the sensors 110 can be used by the item movement management system 104 to coordinate the movement of items 116 on to and off of the rotating platform 108. In some examples, such continuous sensing provides for tracking in real time positions of the items 116 on the rotating platform 108. Thus, if a particular item 116 located on the rotating platform 108 is needed, that particular item 116 can be pulled from the platform without need for additional revolutions to identify the particular item 116.

In some examples, the sensors 110 of the sensor structure 318 may gather sufficient sensor data to enable a determination of how much surface area of the upper surface 306 is utilized (e.g., currently storing the items 116). In some examples, sensor data gathered by the sensors 110 can be used to determine a circumferential coordinate of an item 116 and a radial coordinate of the item. In some examples, the sensor data can be used to determine a specific or standard position of the item with respect to the upper surface 306.

In some examples, the rotating storage system 300 may also include projection device capable of projecting a pattern onto the supper surface 306. This pattern may be used to determine positions of the items 116 with respect to the upper surface 306. In some examples, the rotating storage system 300 may include a light-emitting diode grid system. This system may be used to determine positions of the items 116 with respect to the upper surface 306.

The robotic manipulator 112 may be any suitable material handling equipment (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, and any other suitable material handling equipment that interacts with or otherwise handles objects). The robotic manipulator 112 may include any suitable type and number of sensors disposed throughout the robotic manipulator 112 (e.g., sensors in the base, in the arm, in joints in the arm, in an end effector, or in any other suitable location). The sensors can include sensors configured to detect pressure, force, weight, light, objects, slippage, and any other information that may be used to control and/or monitor the operation of the robotic manipulator 112, including the end effector. The sensors may be in communication with a management device that is local to the robotic manipulator (e.g., the robotic manipulator module 202) and/or may be in direct communication with the item movement management system 104. In this manner, the management device may control the operation of the robotic manipulator 112 and the end effector based at least in part on sensing information received from the sensors. The sensors may include any suitable combination of sensors capable of detecting depth of objects, capturing RGB and other images of objects, scanning machine-readable information, capturing thermal images, detecting position and orientation of objects, and performing any other suitable sensing as described herein.

In some examples, depending on the application for the robotic manipulator 112, different end effectors (e.g., end of arm tools) may be selected. Information about the end effectors available may be organized in terms of grasping function. A grasping function may define functionally how an end effector is capable of manipulating an object. The grasping function may differ between end effectors with respect to capacities, categories, and physical limitations.

Example categories of end effectors include: soft robotic end effectors, vacuum end effectors, electro-adhesion end effectors, and mechanical or electromechanical end effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or Ferrofluids (e.g., fluids having suspended Ferromagnetic particles capable of altering a size or shape of the fluid volume when subjected to a magnetic field). Vacuum end effectors may grasp objects using suction. Electro-adhesion end effectors can include an array of electrodes arranged along a flexible or rigid substrate capable of applying a charge (akin to static electricity) that can adhere an object to the substrate portions that are in contact with the object. Mechanical or electromechanical end effectors may include pinchers, claws, grippers, or other rigid components that may be actuated relative to one another for grasping an object. Other end effectors may also be utilized to facilitate additional grasping functions.

The robotic manipulator 112 may be stationary with respect to the rotating platform 108. In some examples, the robotic manipulator 112 rotates and/or moves with respect to the rotating platform 108. For example, the robotic manipulator structure 320 may include a track that extends circumferentially around the rotating platform 108. The robotic manipulator 112 may be driven along the track in the same or different rotational direction as the rotating platform 108. In some examples, the robotic manipulator structure 320 includes a track or similar structure that extends above the rotating platform 108. In this example, the robotic manipulator 112 may move laterally and/or rotate with respect to the rotation of the rotating platform 108.

In some examples, the robotic manipulator 112 may be used to consolidate items 116 supported by the upper surface 306. For example, the sensors 110 may collect sensor data identifying an open area 322 on the upper surface 306. The open area 322 may be a location to where other items 116 can be consolidated. For example, one or more items 116 bunched together in dense area 324 may be removed by the robotic manipulator 112 and placed at the open area 322. In some examples, similar actions of moving the items 116 to different positions on the upper surface 306 may be performed to actively balance the rotating platform 108. For example, the sensors 110 may collect sensor data that identifies items 116 and their positions. Item information (e.g., item weight) corresponding to the identified items 116 may be accessed and used to determine approximate localized loads on the rotating platform 108. The items 116 may be moved by the robotic manipulator 112 to other positions on the rotating platform 108 in order to balance the loads. In some examples, the items 116 may be moved by the robotic manipulator 112 to other positions on the rotating platform 108 to balance the rotating platform 108 without computing loads. This may be achieved by simply moving items 116 from more item-dense regions to regions have fewer items 116. In some examples, the dense area 324 may include items that are overlapping. Sensor data may be processed to identify the overlapping items and to determine a plan for manipulating the items.

Figure 4:
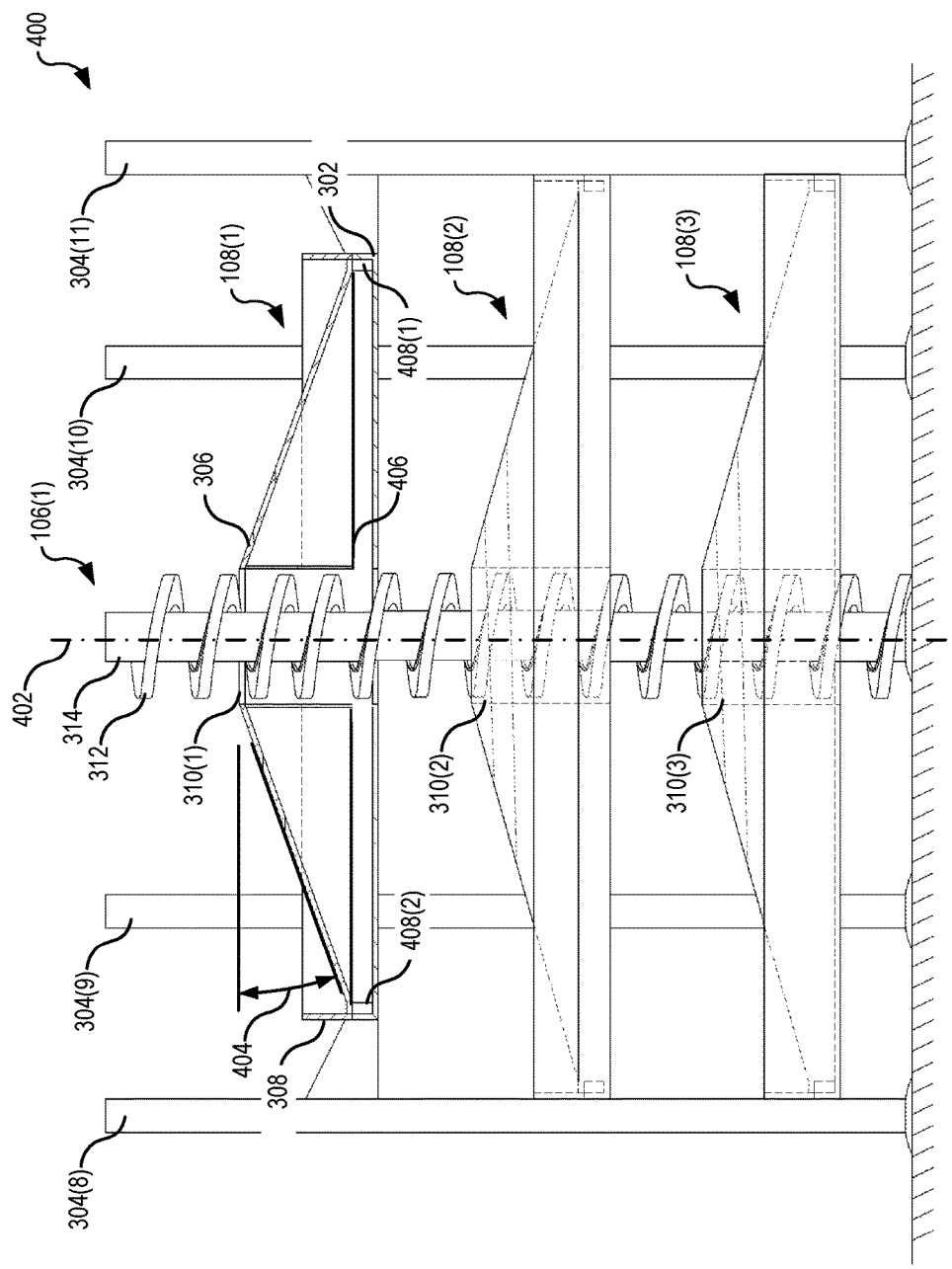
FIG. 4 illustrates a side view, including a profile view, of an example rotating storage system, according to at least one example.

FIG. 4 illustrates a diagram of an example rotating storage system 400, according to at least one example. The rotating storage system 400 is an example of the rotating storage system 300, but includes multiple rotating platforms 108(1)-(3). In the rotating storage system 400, a profile view of the rotating platform 108(1) is shown.

The rotating platforms 108(1)-(3) may be concentrically aligned or otherwise coaxial. In some examples, the rotating platforms 108(1)-(3) are not concentrically aligned. Each rotating platform 108 may include an opening 310 through which the elevator material conveyance device 106(1) may extend. In this manner, the elevator material conveyance device 106(1) may be configured to present items 116 at each of the different levels of the rotating storage system 400 (e.g., at each of the rotating platforms 108(1)-108($n$)). The elevator material conveyance device 106(1) may include a recirculation path for recirculating items 116 to an opposite side of the elevator material conveyance device 106(1) or to any other suitable location. For example, if the elevator material conveyance device 106(1) were configured to move items 116 from above the rotating platform 108(1) to the below the rotating platform 108(3) and the items 116 are not unloaded at any one of the rotating platforms 108(1)-108(3), the items 116 may be transferred to a recirculation path. The recirculation path may then convey the items 116 back to a location above the rotating platform 108(1). If the direction of the elevator material conveyance device 106(1) were reversed (e.g., to move items from below the rotating platform 108(3) to above the rotating platform 108(1)), the recirculation path may convey the items 116 back to a location below the rotating platform 108(3). If the items 116 are not suitable for storing on any of the storage platforms 108, there is insufficient space on the rotating platforms 108, or for any other reason, the recirculation path may also convey the items 116 to a different rotating storage system, an inspection station, or other suitable location.

As illustrated in FIG. 4, the upper surface 306 of each respective rotating platform 108 may be sloped. For example, the upper surface 306 may be frustoconical. In some examples, the upper surface 306 may slope downwards away from a center line 402 of the rotating platform 108 towards the perimeter wall 308. The center line 402 may correspond to the rotational axis 326. For example, the center line 402 and the rotational axis 326 may be the same line or may at least be parallel. In some examples, the downward slope is about constant from the edge of the opening 310 to the perimeter wall 308. For example, as illustrated, the upper surface 306 may slope at an angle 404. The angle 404 may be selected based on design considerations. In some examples, the angle 404 is between 1 degree and 30 degrees. In particular examples, the angle may be less than 1 degree or greater than 30 degrees.

In some examples, the upper surface 306 is defined by a continuous curve, such as an inverted funnel, that begins very steep at or near the center line 402 and becomes more shallow towards the perimeter wall 308. When the items 116 are dropped near the center line 402, a continuously curved upper surface 306 may enable the items 116 to move swiftly along a first portion of the upper surface 306 and gradually slow down along a second portion of the upper surface 306 as the items 116 approach the perimeter wall 308. In some examples, the downward slope is variable so as to include areas of steeper and shallower slopes. For example, a first portion of the upper surface 306 nearer the center line 402 may have a steeper slope, a second portion of the upper surface 306 nearer the perimeter wall 308 may have a shallower slope, and a third portion of the upper surface 306 between the first and second portions may have a different slope. In some examples, gravitational forces (e.g., instead of or in addition to rotational forces) may change with respect to the upper surface 306. For example, the upper surface 306 may have a toroidal or similar shape such that the magnitude of the gravitational forces changes as the radial location of the items 116 change. In this example, the items 116 may move quickly through a first small radial region nearer the center line 402 (e.g., a first negative slope), slow down as the items 116 reach a second larger radial region (e.g., a second negative slope), and slow down even more as the items 116 reach a third larger radial region nearer the perimeter wall 308 (e.g., a first positive slope). This arrangement can be used to distribute the load of the items 116 across the upper surface 306.

In some examples, the rotating platforms 108 in the rotating storage system 400 have different dimensions and surface properties in order to store different items 116. For example, the rotating platform 108(1) has a smaller diameter than the rotating platforms 108(2), 108(3). The diameters of the rotating platforms 108 may be selected based at least in part on the items 116 expected to be stored on the rotating platforms 108. For example, some rotating platforms 108 may have diameters in the range of 40-60 feet. Other rotating platforms 108 may have diameters in the range of 10-15 feet. It is understood, however, that any suitable diameters may be selected. In this example, first items 116 having first characteristics can be stored on the rotating platform 108(1) and second items 116 having second characteristics can be stored on the rotating platform 108(2). Similarly, the slope of the upper surface 306 of the rotating platform 108(1) is steeper than the other upper surfaces.

As introduced herein, a lower surface 406 of the rotating platform 108 may be disposed on the opposite side of the upper surface 306. The lower surface 406 may include any suitable combination of structures to enable rotation of the rotating platform 108. For example, the lower surface 406 may include load wheels 408(1)-(n) configured to support the load of the rotating platform 108. In some examples, the load wheels 408 engage with the support frame 302. The load wheels 408 may be disposed at any suitable location along the lower surface 406. For example, the load wheels 408 may be disposed along the outer portion of the rotating platform 108. In some examples, the lower surface 406 of the rotating platform 108 may include an active or passive counterweight system. The counterweight system may adjust based on the loading of the items 116 on the upper surface 306. For example, a passive counterweight system may include a ring disposed on the lower surface 406 that includes a set of steel balls. The balls may be free to move within the ring to account for loading and rotation of the rotating platform 108. In some examples, an active counterweight system may include a set of pressure sensors and a corresponding set of moveable weights that may be selectively moved to different positions on the lower surface 406. In some examples, balancing of the rotating storage system 400 is achieved by determining and shifting the positions of the items 116 on the rotating platform 106.

Each of the rotating platforms 108(1)-(3) may be driven by an independent drive motor. In some examples, all of rotating platforms 108(1)-(3) are driven by the same drive motor. In any event, the rotating platforms 108(1)-(3) may be rotated at any suitable rate (e.g., 2-3 Rotations Per Minute). In some examples, the rotation rate may depend on properties of the surface, the items 116, and other such information.

In some examples, a single robotic manipulator 112 may service the three rotating platforms 108(1)-108(3). For example, the robotic manipulator 112 may be attached to a vertical track that enables the robotic manipulator 112 to move vertically between the different rotating platforms 108(1)-108(3).

In some examples, the sensor structure 318 is mounted to the underside of one of the rotating platforms 108 (e.g., the lower surface 406). For example, a sensor structure 318 for the rotating platform 108(2) may be mounted on the underside of the rotating platform 108(1). In this manner, the sensor structure 318, including the sensors 110, may rotate relative to the rotating platform 108 with which it is associated.

Figure 5:
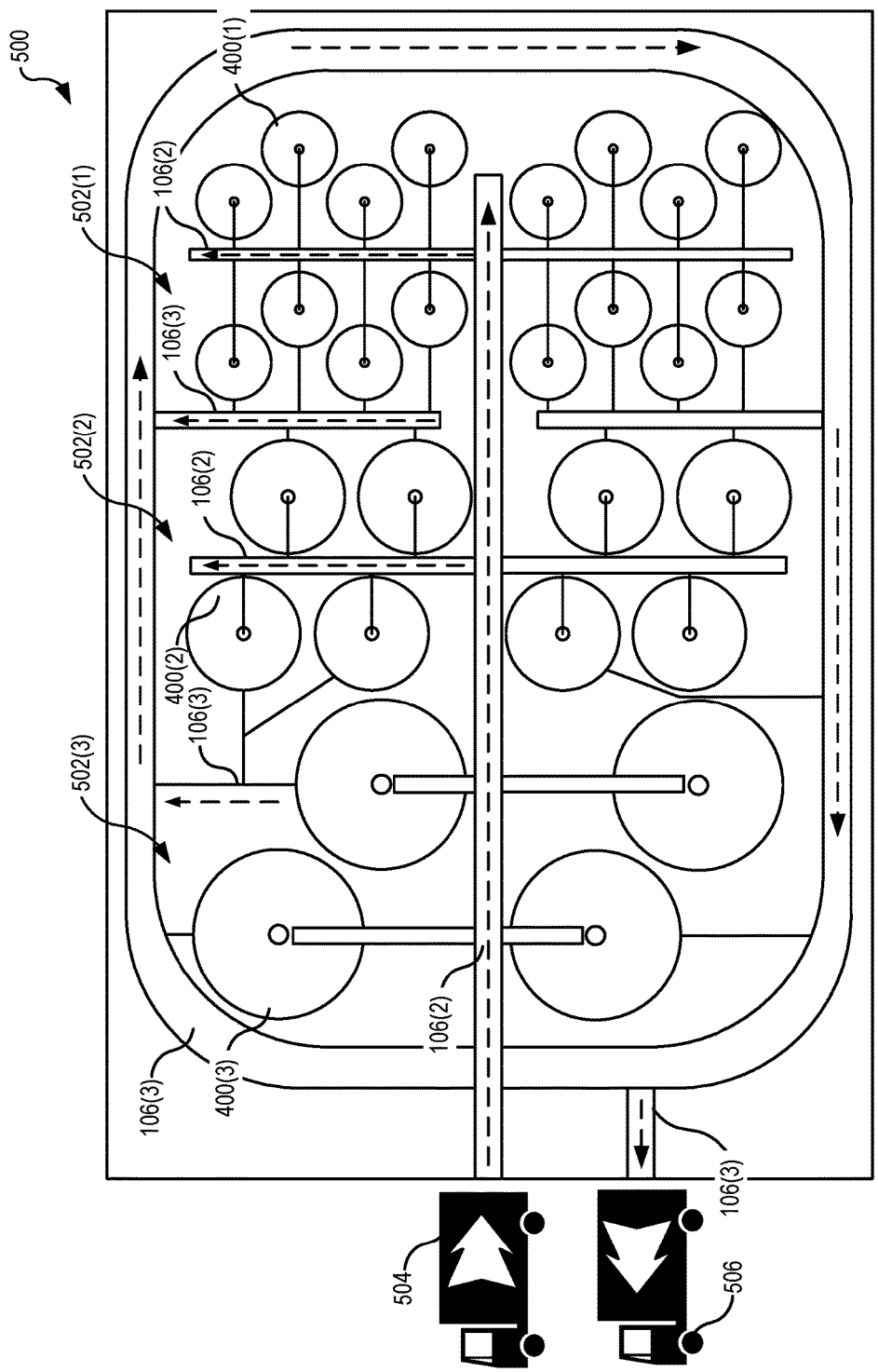
FIG. 5 illustrates an example item storage facility in which techniques relating to managing item storage using rotating platforms may be implemented, according to at least one example.

FIG. 5 illustrates an example item storage facility 500 in which techniques relating to managing item storage using rotating platforms may be implemented, according to at least one example. The item storage facility 500 can be any suitable physical structure such as a warehouse, distribution center, fulfillment center, shipping center, consolidation hub, mail processing center, or any other suitable physical structure configured to store items 116.

The item storage facility 500 may include units 502(1)-(3) of rotating storage systems 400(1)-(3) of various sizes. Individual rotating storage systems 400 may include any suitable number of rotating platforms 108 (e.g., 5, 10, 20, 30, etc.), depending on the implementation. For example, the unit 502(1) may include rotating storage systems 400(1) that have more platforms than the set 502(3). Each rotating storage system 400 may be connected to an inbound material conveyance device 106(2) and an outbound material conveyance device 106(3).

An inbound delivery truck 504 may deliver a set of items 116 of various types and sizes to an inbound material conveyance device 106(2). These items 116 can be identified as they enter the item storage facility 500 by traveling through a scanning tunnel (e.g., a structure including an array of item scanning sensors) or in any other suitable manner. Once identified, a storage location (e.g., a particular rotating platform 108 at a particular rotating storage system 400) may be determined. This may be based on characteristics of the items, properties of the platform, and other similar information. The item storage facility 500 may include moveable diversion structures on the inbound material conveyance devices 106(2) in order to direct the items 116 of the set of items to the appropriate storage locations.

When an item 116 that is stored in the item storage facility 500 is needed, the storage location may be retrieved, the item 116 removed by a robotic manipulator, and the item 116 transferred by the outbound material conveyance device 106(3) to an outbound delivery truck 506.

FIGS. 6, 7, 8, and 9 illustrate example flow diagrams showing respective processes 600, 700, 800, and 900 as described herein. These processes 600, 700, 800, and 900 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Figure 6:
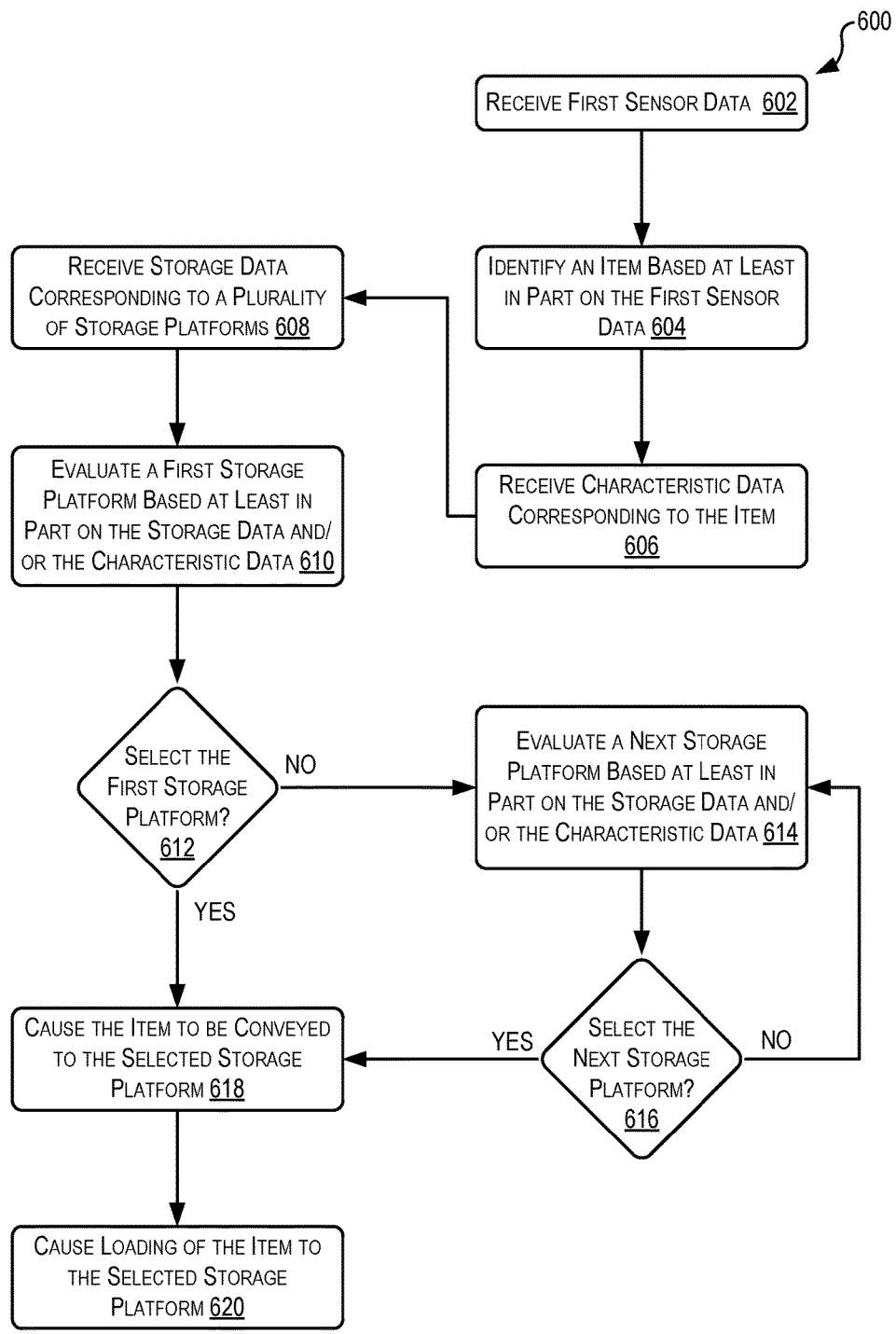
FIG. 6 illustrates a flow diagram depicting example acts for implementing techniques relating to managing item storage using rotating platforms, according to at least one example.

FIG. 6 illustrates a flow diagram depicting the process 600 for implementing techniques relating to managing item storage using rotating platforms, according to at least one example. In particular, the process 600 may correspond to a process for selecting a particular rotating platform for a new item that enters a storage facility. The item movement engine 222 embodied in the item movement management system 104 may perform the process 600 of FIG. 6.

The process 600 begins at 602 by receiving first sensor data. The first sensor data may be received from a sensor that scans items as they enter a storage facility. For example, inbound items may be unloaded onto a conveyor belt that moves the items past the sensor. The first sensor data may be optical data, RFID data, and any other suitable data that can be used to identify items. The first sensor data may be machine readable and/or human readable.

At 604, the process 600 identifies an item based at least in part on the first sensor data. This may include using the first sensor data to obtain an identifier (e.g., a unique product identifier) associated with the item.

At 606, the process 600 receives characteristic data corresponding to the item. This may include using the identifier corresponding to the item to access a database of item information. The characteristic data may be stored in the database and may be received in response to a request to access the database.

At 608, the process 600 receives storage data corresponding to a plurality of storage platforms. This may include accessing a database to determine characteristics of storage platforms in a storage facility. These characteristics may include the type of items suitable for the platforms, available space on the platforms, and any other suitable information.

At 610, the process 600 evaluates a first storage platform based at least in part on the storage data and/or the characteristic data. This may include evaluating whether the first storage platform has sufficient space for the item. This may also include evaluating whether the first storage platform is suitable in other ways for the item.

At 612, it is determined whether the evaluation at 610 resulted in selection of the first storage platform. If no, the process 600 proceeds to 614. At 614, the process 600 evaluates a next storage platform based at least in part on the storage data and/or the characteristic data. This block includes determining whether the next storage platform is suitable for storing the item.

At 616, it is determined whether evaluation at 614 resulted in selection of the next storage platform. If no, the process 600 returns to 614 to evaluate another next storage platform. If yes, the process 600 proceeds to 618. At 618, the process 600 causes the item to be conveyed to the selected storage platform. Similarly, if the answer at 612 is yes, the process 600 proceeds to 618. The function at 618 may include instructing one or more material conveyance devices, moveable diversion structures, and the like to convey the item to the storage platform. This may include horizontal movement, vertical movement, and the like.

At 620, the process 600 causes loading of the item to the selected storage platform. This may include causing diversion of the item from a material conveyance device to the selected storage platform.

Figure 7:
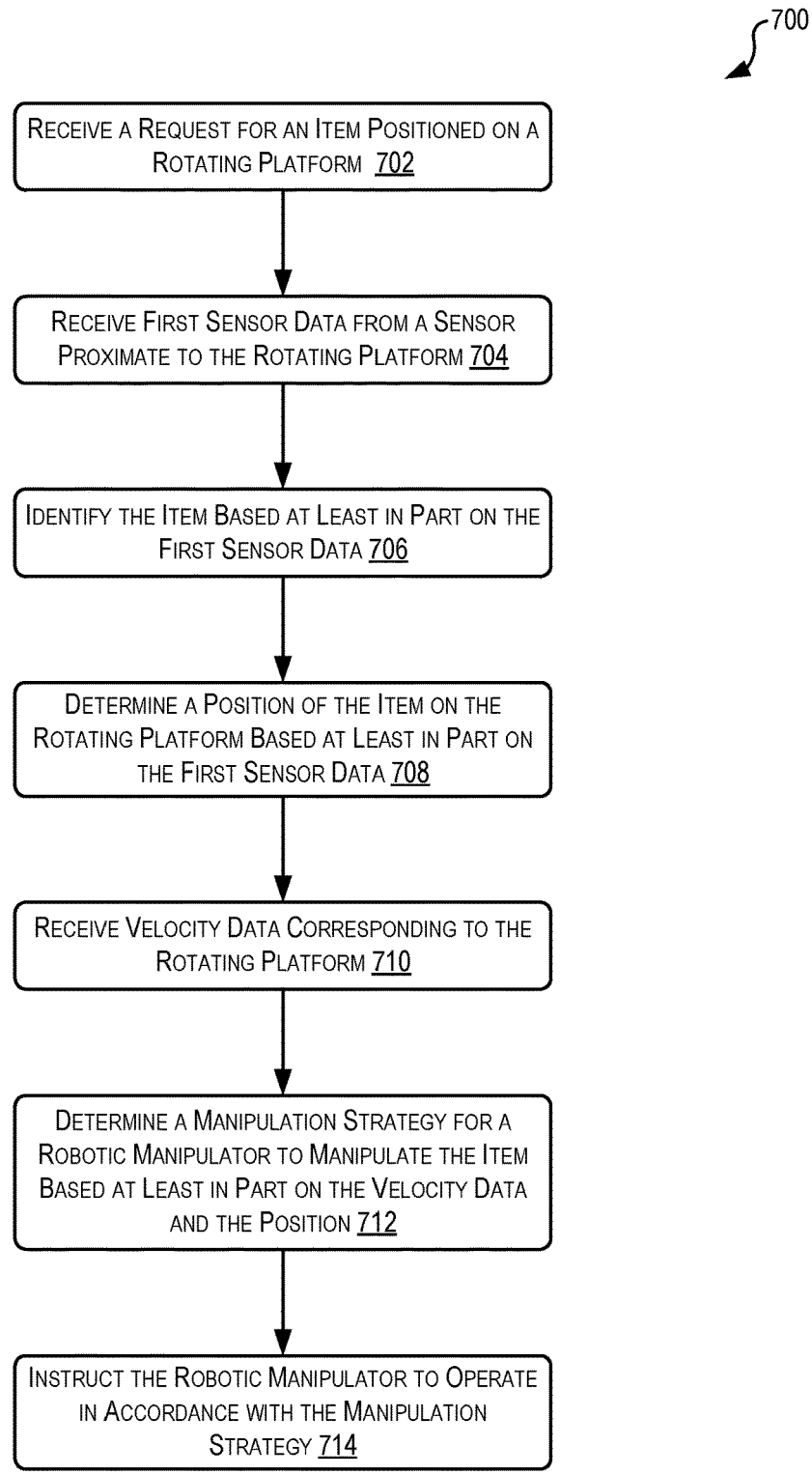
FIG. 7 illustrates a flow diagram depicting example acts for implementing techniques relating to managing item storage using rotating platforms, according to at least one example.

FIG. 7 illustrates a flow diagram depicting the process 700 for implementing techniques relating managing item storage using rotating platforms, according to at least one example. In particular, the process 700 may correspond to a process for manipulating an item stored on a rotating storage platform. The item movement engine 222 embodied in the item movement management system 104 may perform the process 700 of FIG. 7.

The process 700 begins at 702 by receiving a request for an item positioned on a rotating platform. This may include receiving the request from an order management system that receives and processes customer orders. Thus, the item may be requested in order to include it in a customer order. In some examples, the order management system may be associated with the item movement management system 104. The item may be positioned on the rotating platform together with other items. In some examples, the request for the item may be a request by the item movement management system 104 for purposes of consolidating items, singulating items, or performing other item management techniques.

At 704, the process 700 receives first sensor data from a sensor proximate to the rotating platform. The sensor may be any suitable sensor such as an optical sensor, RFID reader and antenna, and the like. The first sensor data may be collected while the rotating platform is rotating.

At 706, the process 700 identifies the item based at least in part on the first sensor data. This may include processing the first sensor data to identify the item. For example, if the first sensor data were image data, identifying the item may include processing the image data to identify the item.

At 708, the process 700 determines a position of the item on the rotating platform based at least in part on the first sensor data. This may include accessing a database to obtain the position from position data previously generated based on the first sensor data. In some examples, determining the position of the item may include identifying a standard position of the item with respect to the rotating platform. In some examples, determining the position of the item may include identifying a specific position of the item with respect to the rotating platform and/or the sensor.

At 710, the process 700 receives velocity data corresponding to the rotating platform. The velocity data may be received together with the sensor data. In some examples, the velocity data is received from a sensor configured to sense velocity of the rotating platform. The velocity may be represented in units per time (e.g., feet/second), RPM, or in any other suitable fashion. In some examples, receiving the velocity data includes accessing a constant velocity value in a database.

At 712, the process 700 determines a manipulation strategy for a robotic manipulator to manipulate the item based at least in part on the velocity data and the position. This may include a trajectory for the robotic manipulator to follow in order to pick up the item from the rotating platform while the rotating platform is rotating. The manipulation strategy may also indicate where to release the item (e.g., at a different position on the rotating platform or on a material conveyance device).

At 714, the process 700 instructs the robotic manipulator to operate in accordance with manipulation strategy. This may include causing the robotic manipulator to generate its own instructions based on the manipulation strategy.

Figure 8:
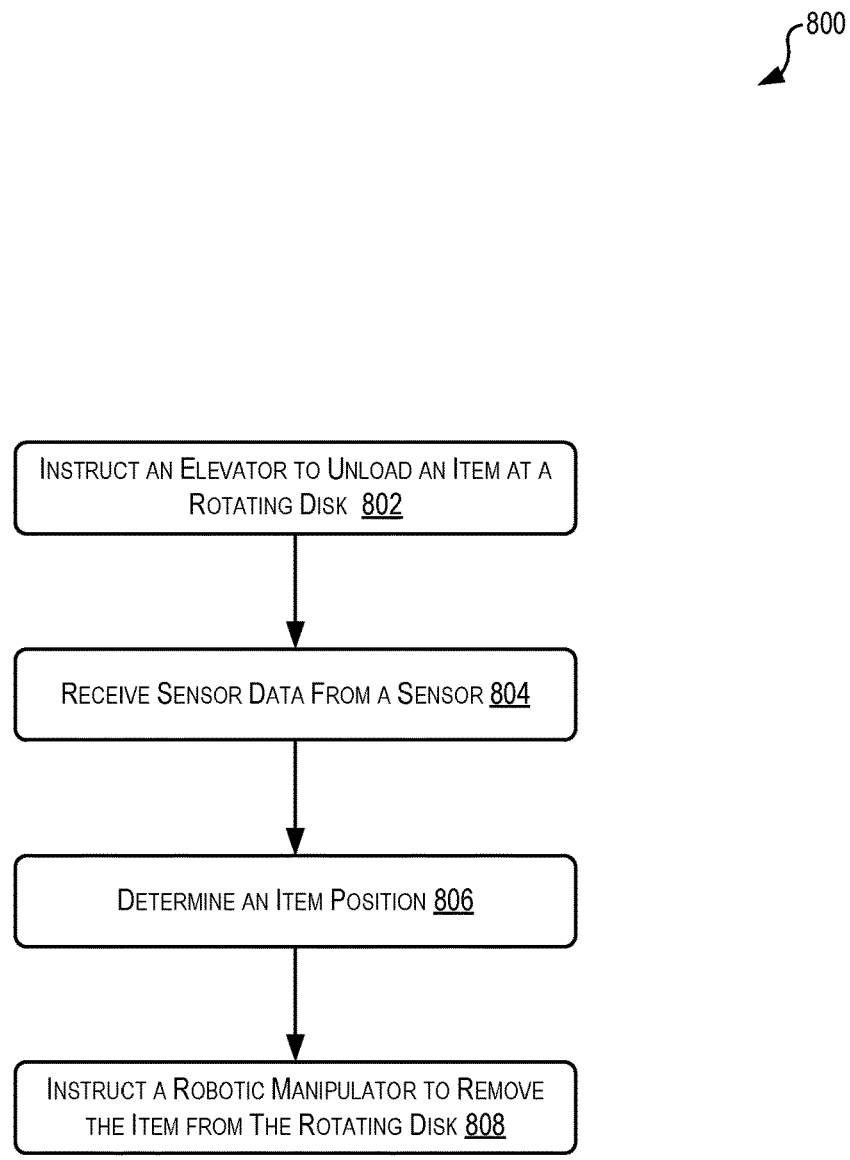
FIG. 8 illustrates a flow diagram depicting example acts for implementing techniques relating to managing item storage using rotating platforms, according to at least one example.

FIG. 8 illustrates a flow diagram depicting the process 800 for implementing techniques relating to managing item storage using rotating platforms, according to at least one example. In particular, the process 800 may depict a process for placing and removing an item from a rotating disk. The item movement engine 222 embodied in the item movement management system 104 may perform the process 800 of FIG. 8.

The process 800 begins at 802 by instructing an elevator to unload an item at a rotating disk. This may include unloading the item from the elevator at an upper surface of the rotating disk.

At 804, the process 800 receives sensor data from a sensor. The sensor data may identify the item disposed on the upper surface of the rotating disk.

At 806, the process 800 determines an item position. The item position may be on the upper surface and can be determined with respect to the sensor. The item position may correspond to the item.

At 808, the process 800 instructs a robotic manipulator to remove the item from the rotating disk. This may include removing the item from the upper surface at the item position.

The process 800 may further include receiving other sensor data from the sensor. The other sensor data may identify an area on the upper surface that is devoid of items. The process 800 may further include determining that the area is sufficient for receiving the item based at least in part on the other sensor data and an item characteristic corresponding to the item. The process 800 may further include instructing the robotic manipulator to place the item in the area.

In some examples, the item is a first item, the item position is a first item position, and the sensor data identifies a second item disposed adjacent to the first item. In this example, the process 800 may further include determining a second item position on the upper surface corresponding to the second item. The process 800 may further include determining that the first item position and the second item position at least partially overlap each other. The process 800 may further include, after instructing the robotic manipulator to remove the first item, instructing the robotic manipulator to place the second item at a different position on the upper surface.

In some examples, the item is unloaded at 802 at the upper surface and removed from the upper surface at 808 while the rotating disk is rotating.

Figure 9:
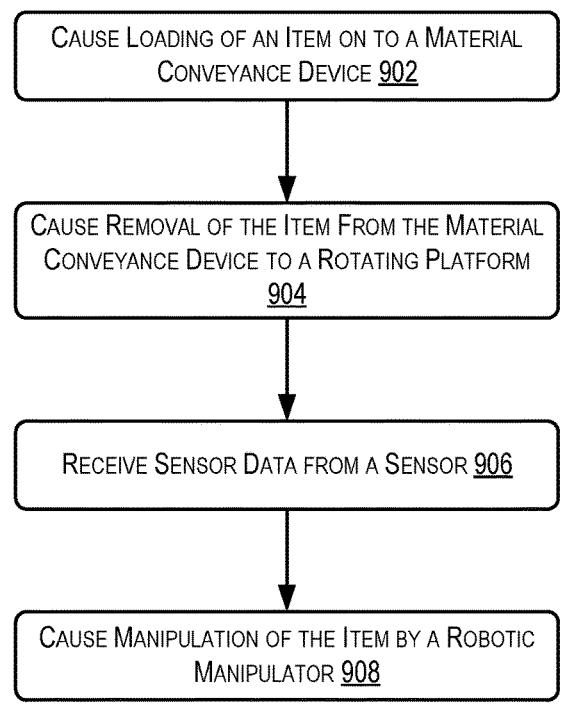
FIG. 9 illustrates a flow diagram depicting example acts for implementing techniques relating to managing item storage using rotating platforms, according to at least one example.

FIG. 9 illustrates a flow diagram depicting the process 900 for implementing techniques relating to managing item storage using rotating platforms, according to at least one example. In particular, the process 900 may depict a process for placing an item and manipulating an item with respect to a rotating platform. The item movement engine 222 embodied in the item movement management system 104 may perform the process 900 of FIG. 9.

The process 900 begins at 902 by causing loading of an item on to a material conveyance device. In some examples, the material conveyance device may include a spiral elevator.

At 904, the process 900 causes removal of the item from the material conveyance device to a rotating platform. The rotating platform may be disposed proximate to the material conveyance device and may include a sloped surface. In some examples, causing removal of the item from the material conveyance device to the rotating platform includes causing a moveable diversion structure of the spiral elevator to divert the item from the spiral elevator to the rotating platform. In some examples, the rotating platform is a first rotating platform of a plurality of rotating platforms. In this example, individual rotating platforms of the plurality of rotating platforms may be concentrically aligned. In some examples, the material conveyance device is configured to deliver items to each of the plurality of rotating platforms. In some examples, the plurality of rotating platforms may rotate at a constant velocity or variable velocity. The process 900 may further include receiving item data identifying one or more characteristics of the item. The process 900 may further include identifying the first rotating platform from among the plurality of rotating platforms based at least in part on the item data. The first rotating platform may be disposed adjacent to the material conveyance device.

At 906, the process 900 receives sensor data from a sensor. The sensor may be configured to sense items disposed on the sloped surface. The sensor data may at least identify the item. In some examples, the sensor may be coupled to an underside of a second rotating platform of the plurality of rotating platforms. The first rotating platform may be disposed below the second rotating platform. In some examples, the sensor includes at least one of an optical sensor or a radio-frequency identification (RFID) reader.

At 908, the process 900 causes manipulation of the item by a robotic manipulator. This may be based at least in part on the sensor data.

The process 900 may further include causing removal of the item from the sloped surface by the robotic manipulator based at least in part on receiving information identifying a customer order including the item.

The process 900 may further include receiving other sensor data from the sensor. The other sensor data may identify other items disposed on the sloped surface. The process 900 may further include determining, based at least in part on the other sensor data, position data identifying individual positions of the other items with respect to the rotating platform. The process 900 may further include associating the position data with the respective items in a database. The position data may be usable by the robotic manipulator to manipulate the other items.

In some examples, the material conveyance device is a first material conveyance device. In this example, manipulation of the item by the robotic manipulator may include at least one of removal of the item from the sloped surface and placement of the item on a second material conveyance device, or movement of the item from a first location on the sloped surface to a second location on the sloped surface.

Figure 10:
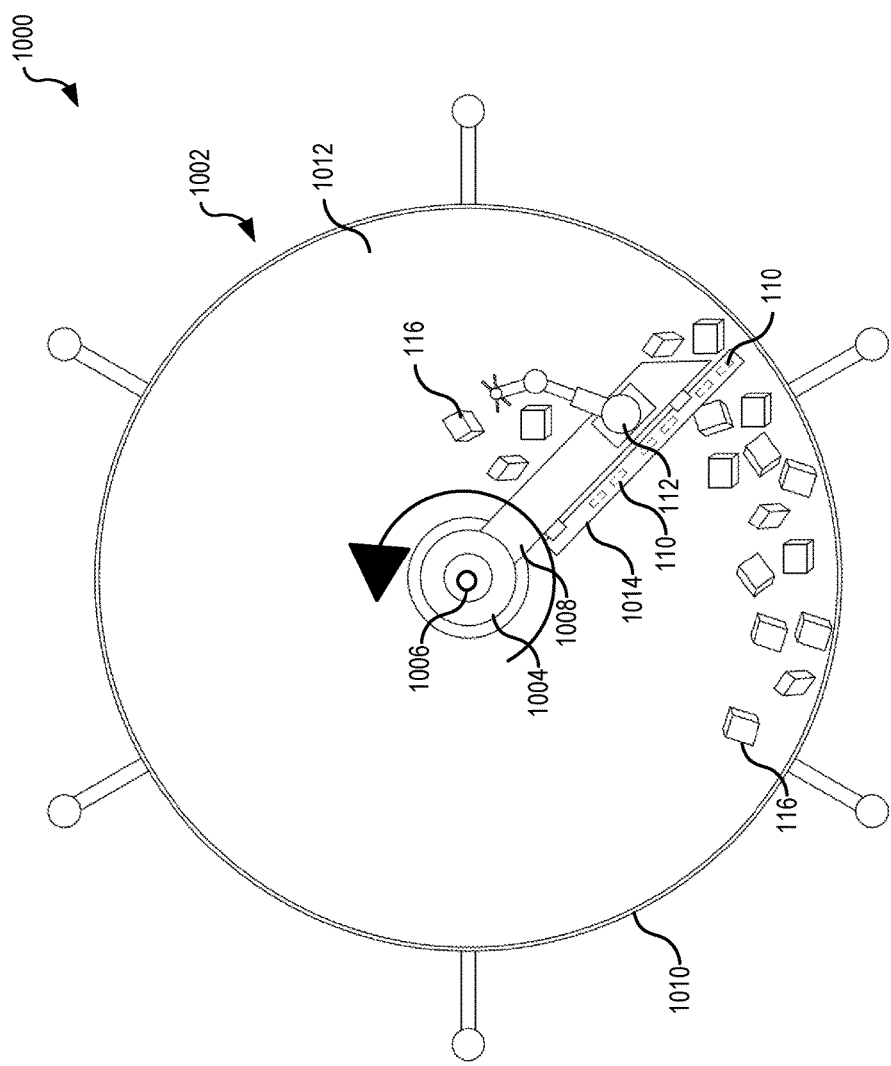
FIG. 10 illustrates a diagram of an example rotating storage system, according to at least one example.

FIG. 10 illustrates a top view of an example rotating storage system 1000, according to at least one example. The rotating storage system 1000 includes a stationary platform 1002 and a rotating structure 1004 aligned about a center axis 1006. The rotating structure 1004 may be coupled to a drive motor to enable rotation of the rotating structure 1004 about the center axis 1006. The rotating structure 1004 may include an elongate wiper element 1008 or other comparable structure configured to "wipe" or otherwise move items 116 away from the center axis 1006 toward a circumferential edge 1010 of the stationary platform 1002 as the rotating structure 1004 and the wiper element 1008 rotate with respect to the stationary platform 1002. This wiping action may function to consolidate the items 116 along an upper surface 1012 of the stationary platform 1002, and more especially near the circumferential edge 1010, as illustrated.

The wiper element 1008 may include the robotic manipulator 112 and a sensor structure 1014 including the sensor(s) 110. In some examples, the robotic manipulator 112 and/or the sensor structure 1014 are coupled to the rotating structure 1004 independent of the wiper element 1008. The robotic manipulator 112 may be configured to manipulate the items 116 on the upper surface 1012 of the stationary platform 1002 as the wiper element 1008 rotates. The sensor structure 1014 may be configured to enable the sensors 110 to gather sensor data relating to the items 116 on the upper surface 1012 of the stationary platform 1002.

The techniques described herein with reference to rotating platforms may be equally applicable to the rotating storage system 1000, depending on the implementation.

While the techniques and systems of this disclosure are described with reference to storing items in storage facilities, they are not so limited. For example, the systems described herein may be used to store items in vending machines disposed in public areas. The techniques and systems described herein may enable automatic retrieval and storage of items in vending machines. A vending machine may retrieve items in response to a customer order or other instruction received via an interface of the vending machine.

Figure 11:
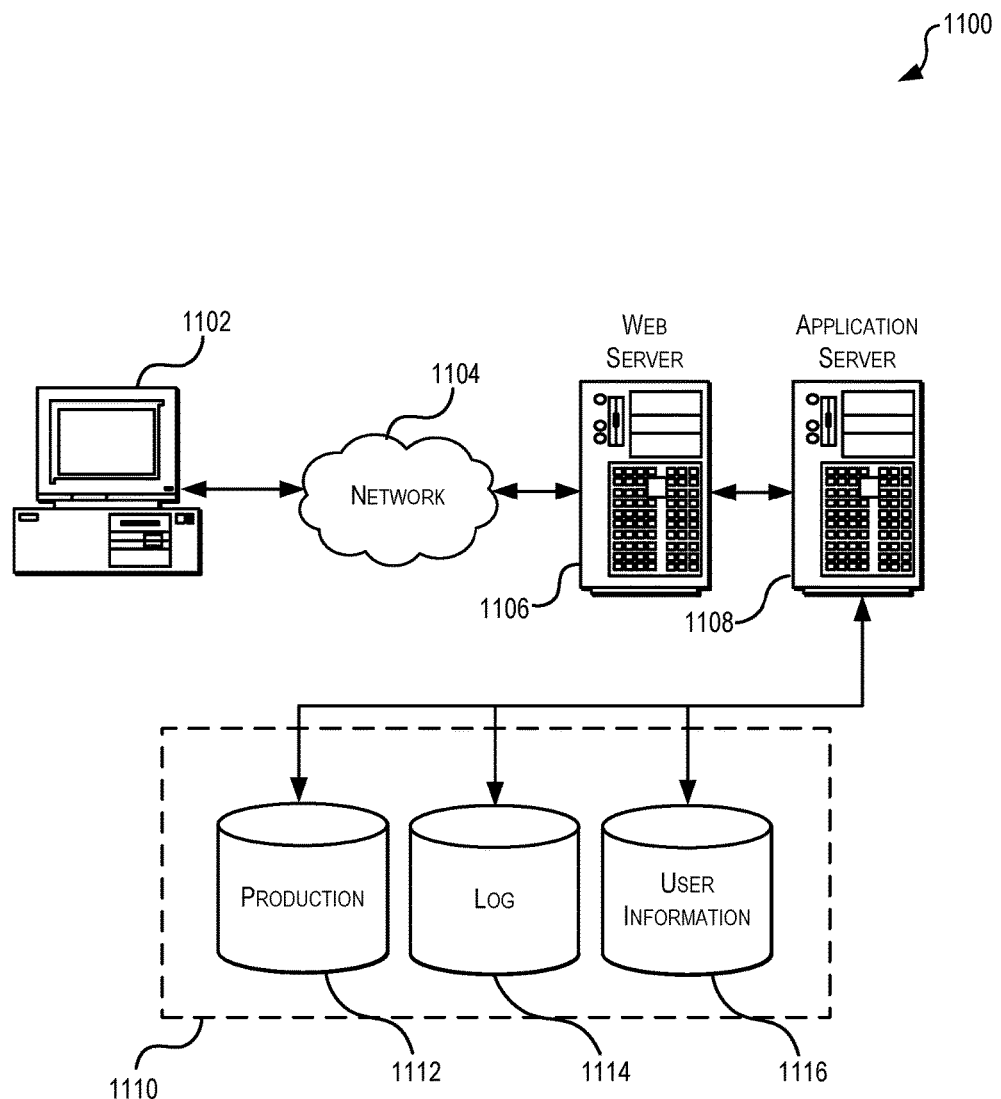
FIG. 11 illustrates an environment in which various examples can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk ("DVD"), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   a conical platform defining a center axis, and comprising:
      a sloped, annular upper surface;
      an inner circumferential edge;
      an outer circumferential edge spaced radially outward from the inner circumferential edge; and
      a side wall extending upward from the sloped, annular upper surface along the outer circumferential edge, the conical platform being supported on a frame for rotation about the center axis;
   a material conveyance device disposed adjacent to the conical platform and configured to move items between a loading location and the sloped, annular upper surface;
   a robotic manipulator disposed adjacent to the conical platform and configured to manipulate the items disposed on the sloped, annular upper surface;
   a sensor disposed adjacent to the conical platform and configured to sense the items disposed on the sloped, annular upper surface; and
   a computer system in communication with at least the material conveyance device, the robotic manipulator, and the sensor, and configured to:
      receive sensor data from the sensor, the sensor data identifying an item disposed on the sloped, annular upper surface, the item moved to the sloped, annular upper surface by the material conveyance device;
      determine an item position on the sloped, annular upper surface based at least in part on the sensor data, the item position corresponding to the item; and
      instruct the robotic manipulator to remove the item from the sloped, annular upper surface at the item position.

2. The system of claim 1, wherein the computer system is further configured to:
   receive other sensor data from the sensor, the other sensor data identifying an area on the sloped, annular upper surface that is devoid of other items;
   determine that the area is sufficient for receiving the item based at least in part on the other sensor data and an item characteristic corresponding to the item; and
   instruct the robotic manipulator to place the item in the area.

3. The system of claim 1, wherein:
   the item is a first item, the item position is a first item position, and the sensor data identifies a second item disposed adjacent to the first item; and
   the computer system is further configured to:
      determine a second item position on the sloped, annular upper surface corresponding to the second item;
      determine that at least one of the first item position or the second item position at least partially overlaps the other; and
      after instructing the robotic manipulator to remove the first item, instruct the robotic manipulator to place the second item at a different position on the sloped, annular upper surface.

4. The system of claim 1, wherein the item is moved to the sloped, annular upper surface and removed from the sloped, annular upper surface while the conical platform is rotating.

5. The system of claim 1, wherein:
   the material conveyance device comprises a spiral structure coaxially aligned with the center axis and extending through an opening of the conical platform; and
   the sloped, annular upper surface slopes downwardly away from the center axis towards the outer circumferential edge.

6. A computer-implemented method, comprising:
   causing, by a computing device, loading of an item on to a material conveyance device;
   causing, by the computing device, removal of the item from the material conveyance device to an upper surface of a rotating platform, the rotating platform disposed proximate to the material conveyance device, the upper surface comprising a sloped, annular surface;
   receiving, by the computing device, sensor data from a sensor configured to sense items disposed on the upper surface, the sensor data at least identifying a position of the item with respect to the rotating platform; and
   causing, by the computing device, manipulation of the item based at least in part on the sensor data.

7. The computer-implemented method of claim 6, wherein:
   the rotating platform is a first rotating platform of a plurality of rotating platforms, individual rotating platforms of the plurality of rotating platforms being coaxially aligned; and the material conveyance device is configured to deliver the items to each of the plurality of rotating platforms.

8. The computer-implemented method of claim 7, further comprising:
receiving item data identifying one or more characteristics of the item; and
identifying the first rotating platform from among the plurality of rotating platforms based at least in part on the item data, the first rotating platform disposed adjacent to the material conveyance device.

9. The computer-implemented method of claim 7, wherein the plurality of rotating platforms rotate at a constant velocity.

10. The computer-implemented method of claim 7, wherein the sensor is coupled to an underside of a second rotating platform of the plurality of rotating platforms, the first rotating platform disposed below the second rotating platform.

11. The computer-implemented method of claim 6, wherein the sensor comprises at least one of an optical sensor or a radio-frequency identification (RFID) reader.

12. The computer-implemented method of claim 6, wherein:
the material conveyance device is a spiral elevator; and
causing removal of the item from the material conveyance device to the rotating platform comprises causing a moveable diversion structure of the spiral elevator to divert the item from the spiral elevator to the rotating platform.

13. The computer-implemented method of claim 6, further comprising:
receiving other sensor data from the sensor, the other sensor data identifying other items disposed on the upper surface;
determining, based at least in part on the other sensor data, position data identifying individual positions of the other items with respect to the rotating platform; and
associating the position data with the respective items in a database, the position data usable to manipulate the other items.

14. The computer-implemented method of claim 6, wherein:
the material conveyance device is a first material conveyance device; and
causing manipulation of the item comprises causing manipulation of the item by a robotic manipulator, the manipulation comprising at least one of:
removal of the item from the upper surface and placement of the item on a second material conveyance device; or
movement of the item from a first location on the upper surface to a second location on the upper surface.

15. A system, comprising:
a support frame;
a conical platform supported by the support frame and defining a center axis, the conical platform comprising:
an annular upper surface extending about the center axis;
a side wall extending around an outer circumferential edge of the conical platform; and
a drive configured to rotate the conical platform about the center axis;
a sensor configured to sense items disposed on the annular upper surface; and
a computer system in communication with the sensor, and configured to:
receive sensor data from the sensor, the sensor data identifying an item disposed on the annular upper surface; and
determine an item position on the annular upper surface based at least in part on the sensor data, the item position corresponding to the item.

16. The system of claim 15, wherein the annular upper surface is a frustoconical surface.

17. The system of claim 15, further comprising a conveyance device configured to present the items at the annular upper surface, and a spiral structure coaxially aligned with the center axis of the conical platform and extending through an opening of the conical platform.

18. The system of claim 15, further comprising a robotic manipulator disposed proximate to the conical platform and configured to manipulate the items disposed on the annular upper surface; and
wherein the computer system is in communication with the robotic manipulator, and is further configured to, after determining the item position, instruct the robotic manipulator to remove the item from the annular upper surface.

19. The system of claim 18, wherein the robotic manipulator is coupled to a track and configured to rotate with respect to the conical platform.

* * * * *